United States Patent
Leibinger et al.

(10) Patent No.: US 6,835,912 B2
(45) Date of Patent: Dec. 28, 2004

(54) LASER CUTTING MACHINE WITH TWO Y-AXIS DRIVES

(75) Inventors: Peter Leibinger, Avon, CT (US); Thomas Rauser, Farmington, CT (US); Leonid Zeygerman, West Hartford, CT (US)

(73) Assignee: Trumpf, Inc., Farmington, CT (US)

( * ) Notice: Subject to any disclaimer, the term of this patent is extended or adjusted under 35 U.S.C. 154(b) by 0 days.

(21) Appl. No.: 10/156,886

(22) Filed: May 28, 2002

(65) Prior Publication Data

US 2003/0222065 A1 Dec. 4, 2003

(51) Int. Cl.[7] .......................... B23K 26/02; B23K 26/08
(52) U.S. Cl. ........................ 219/121.67; 219/121.79; 700/166
(58) Field of Search ....................... 219/121.6, 121.67, 219/121.68, 121.69, 121.72, 121.79, 121.82; 700/166

(56) References Cited

U.S. PATENT DOCUMENTS

| | | | |
|---|---|---|---|
| 2,717,979 A | 9/1955 | Gardiner | |
| 3,209,121 A | 9/1965 | Manz | |
| 3,449,754 A | 6/1969 | Stutz | |
| 5,267,478 A | 12/1993 | Stridsberg | |
| 5,574,348 A | 11/1996 | Ehlerding | |
| 5,751,585 A | 5/1998 | Cutler et al. | |
| 6,462,301 B1 | * 10/2002 | Scott et al. | |

FOREIGN PATENT DOCUMENTS

| | | |
|---|---|---|
| DE | 41 23 323 A1 | 1/1993 |
| EP | 0 010 578 A1 | 9/1979 |

* cited by examiner

Primary Examiner—Samuel M. Heinrich
(74) Attorney, Agent, or Firm—Pepe & Hazard LLP

(57) ABSTRACT

A tool for machining workpieces by motion of the machining tool relative to the workpiece has a support extending in the X-axis over a work support table and movable in the Y-axis. A machining tool housing is movable on the support in the Y-axis. A portion of the housing containing the machining tool is movable with respect to the mounted portion in the Y-axis within a limited range of motion. A computer control effects operation of drive motors to move the housing along the support and the support along the machining tool table to machine a workpiece supported on said worktable in X and Y axes, and the computer control can also effect operation of another drive motor to rapidly move of the housing portion and machining tool in the Y-axis when the desired length of motion in the Y-axis is within its range of motion.

12 Claims, 6 Drawing Sheets

LASER CUTTING MACHINE WITH TWO Y-AXIS DRIVES

BACKGROUND OF THE INVENTION

The present invention relates to machine tools, and, more particularly, to machine tools in which the machining head is moved in multiple axes relative to the workpiece.

In laser cutting installations and other machining operations involving large plate-like workpieces, it is common to support the workpiece on a worktable and to effect relative movement between the machining head and the workpiece. Although the worktable can be moved relative to the machining head, generally it is preferable to mount the machining tool on a support located above the workpiece and to move the support with the machining head thereon relative to the workpiece in both X and Y axes under computer control. Typically, the support for the machining head is a bridge which extends between the side rails and on which it is movable relative to the workpiece on one axis. Moreover, the machining head is generally supported on the bridge so that it is movable along the length of the bridge thus providing relative motion of the machining head in both X and Y directions.

As will be readily appreciated, the bridge is a substantial structure with a relatively large mass so that motion of the bridge in the one axis requires substantial power to overcome the inertia and to effect the continued motion. The power for movement in the transverse direction is much less because the machining head is lighter and it moves along the length of the bridge.

Because of the large mass and the need to start and stop the motion of the bridge, the cutting action of small intricate contours may not be as precise as is desirable, and the costs and wear of the drive system for the bridge can adversely effect the economics of the types of parts to be processed in a particular machine tool installation are small and of intricate configuration.

Accordingly, it is an object of the present invention to provide a novel machine tool in which the motion required of a substantial bridge or like support may be substantially reduced.

It is also an object to provide such a machine tool in which the quality of the machining of small intricate contours is improved.

Another object is to provide such a machine tool which can be fabricated readily and which is relatively simple to operate.

SUMMARY OF THE INVENTION

It has now been found that the foregoing and related objects may be readily attained a machine tool for machining workpieces by motion of the machining tool relative to the workpiece comprising a worktable having X and Y axes and adapted to support a workpiece thereon, and a support extending transversely above the worktable in the X-axis and movable along the Y-axis of the worktable. First machining tool mounting means is movably mounted on the support for movement along the support in the X-axis, and second machining tool mounting means is movably mounted on the first machining tool mounting means for movement in the Y-axis relative to the support within a range of motion. The machining tool mounted in the second machining tool mounting means.

Also provided are first drive means for the support to move the support in the Y-axis over the worktable, second drive means for the first machining tool mounting means to move the first machining tool mounting means in the X-axis along the support, and third drive means for moving the second machining tool mounting means in the Y-axis relative to the first machining tool mounting means. A computer control is provided to effect operation of the first and second drive means to move the machining tool in X and Y axes to machine a workpiece supported on the worktable and to effect operation of the third drive means for rapid movement of the machining tool in the Y-axis.

Generally, the support is a bridge member spaced above and extending transversely of the worktable, and the machining tool is supported on the second machining tool mounting means for vertical movement in a Z-axis. The machine tool includes fourth drive means for moving the machining tool in the Z-axis, and the computer control also effects operation of the fourth drive means.

The computer control includes means for determining whether a desired length of movement in the Y-axis is within the range of motion of the second machining tool mounting means on the first machining tool mounting means so as to effect the desired movement by the third drive means in the Y-axis. Preferably, the computer control also includes means for determining whether a desired length of movement in the Y-axis is beyond the range of motion of the second machining tool mounting means and for effecting the desired movement of the machining tool in the Y-axis by operation of the first drive means to move the support and by operation of the third drive means to move the second machining tool mounting means. The computer control desirably may include means for effecting a large displacement of the support in the Y-axis to reposition the machining tool relative to the workpiece and thereafter for effecting a smaller displacement of the second machining tool mounting means in the Y-axis to effect the machining of the workpiece in the Y-axis.

The machining tool may be a laser cutting head, and the machine tool is desirably mounted in a housing providing the second machining tool mounting means and slidable on guides supported on a transverse axis housing providing the first machining tool mounting means and which is movable on the support in the X-axis.

BRIEF DESCRIPTION OF THE ATTACHED DRAWINGS

DETAILED DESCRIPTION OF THE ILLUSTRATED EMBODIMENT

Figure 1:
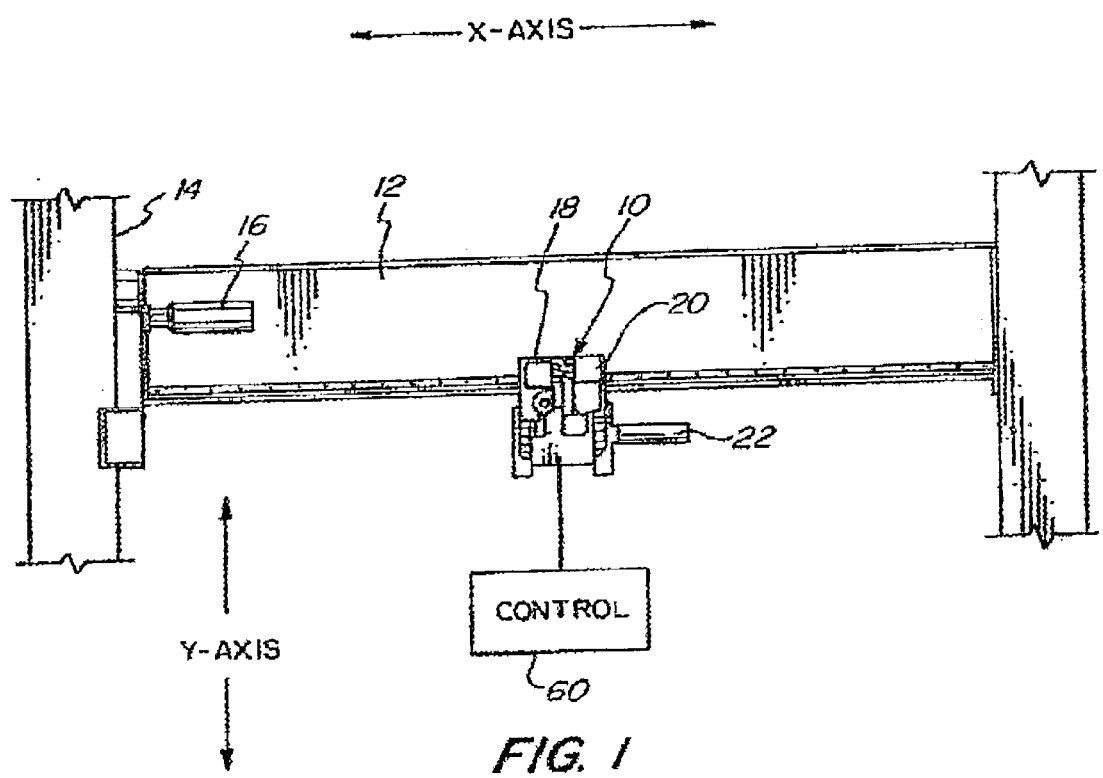
FIG. 1 is a fragmentary plan view of a laser cutting installation having a laser cutting assembly embodying the present invention mounted on the bridge.
Figure 2:
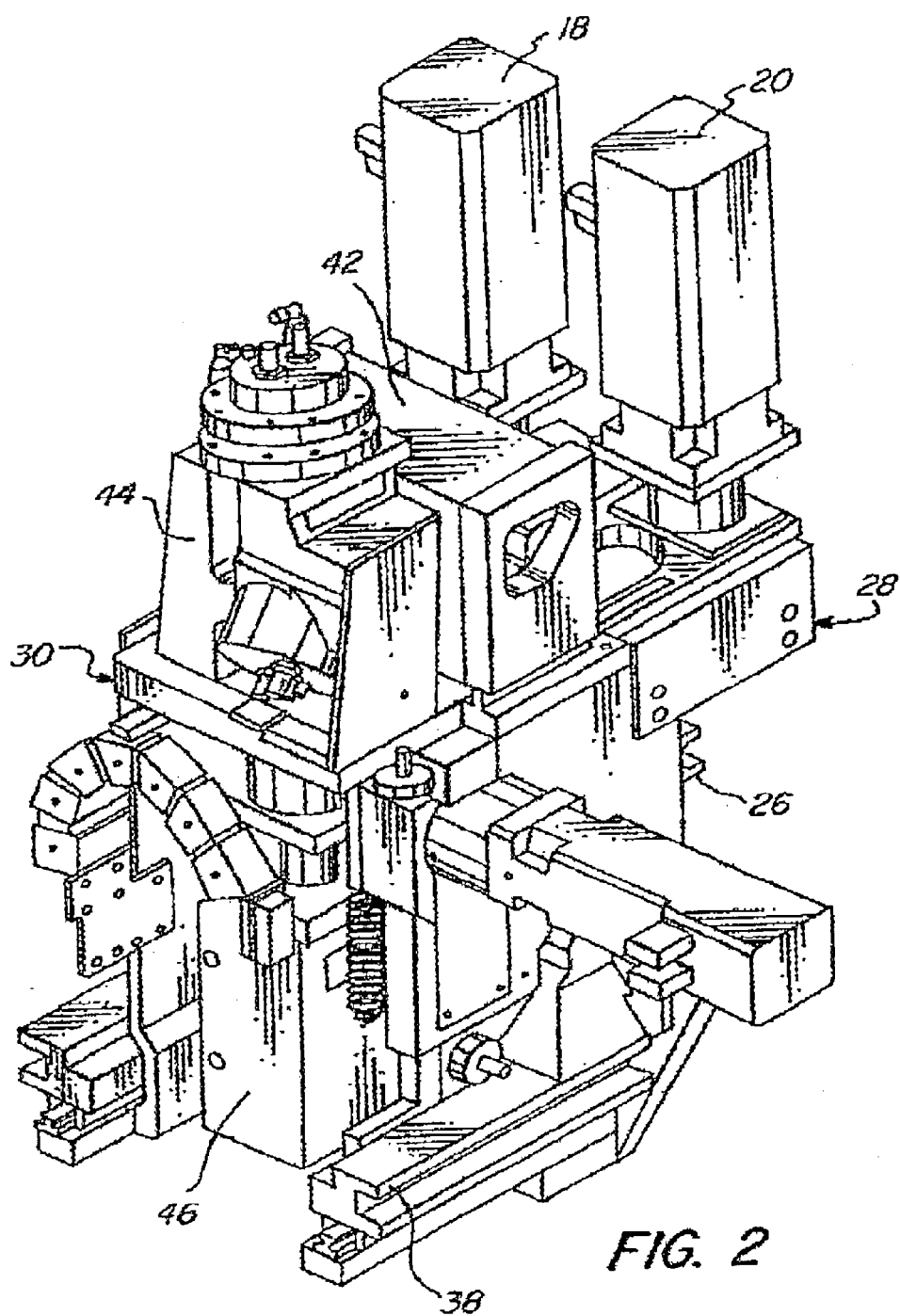
FIG. 2 is a perspective view of the laser cutting assembly with the housing removed.
Figure 3:
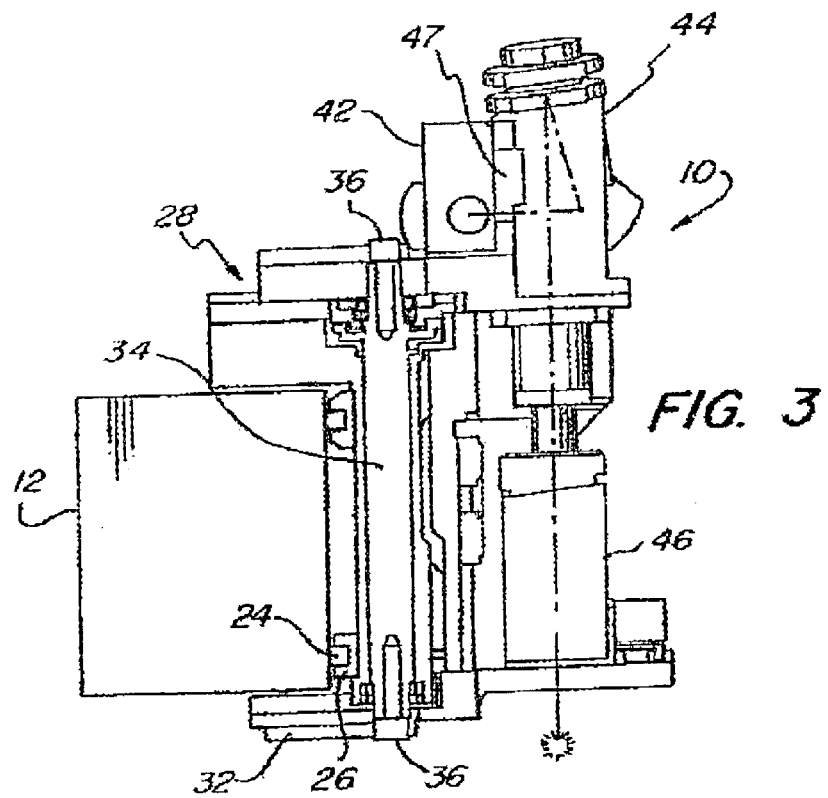
FIG. 3 is a side elevational view thereof as mounted on the bridge.
Figure 4:
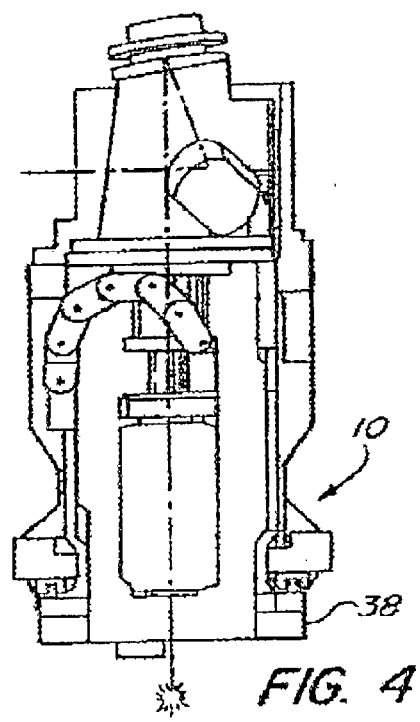
FIG. 4 is a front elevational view thereof.
Figure 5:
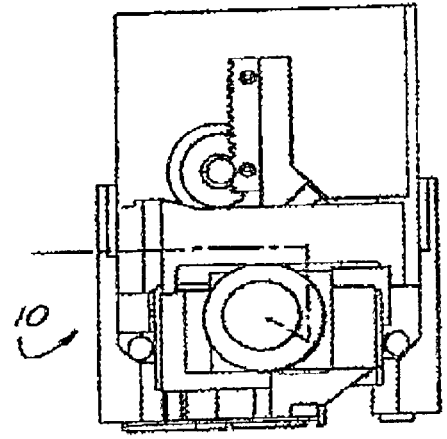
FIG. 5 is a top view thereof.
Figure 6:
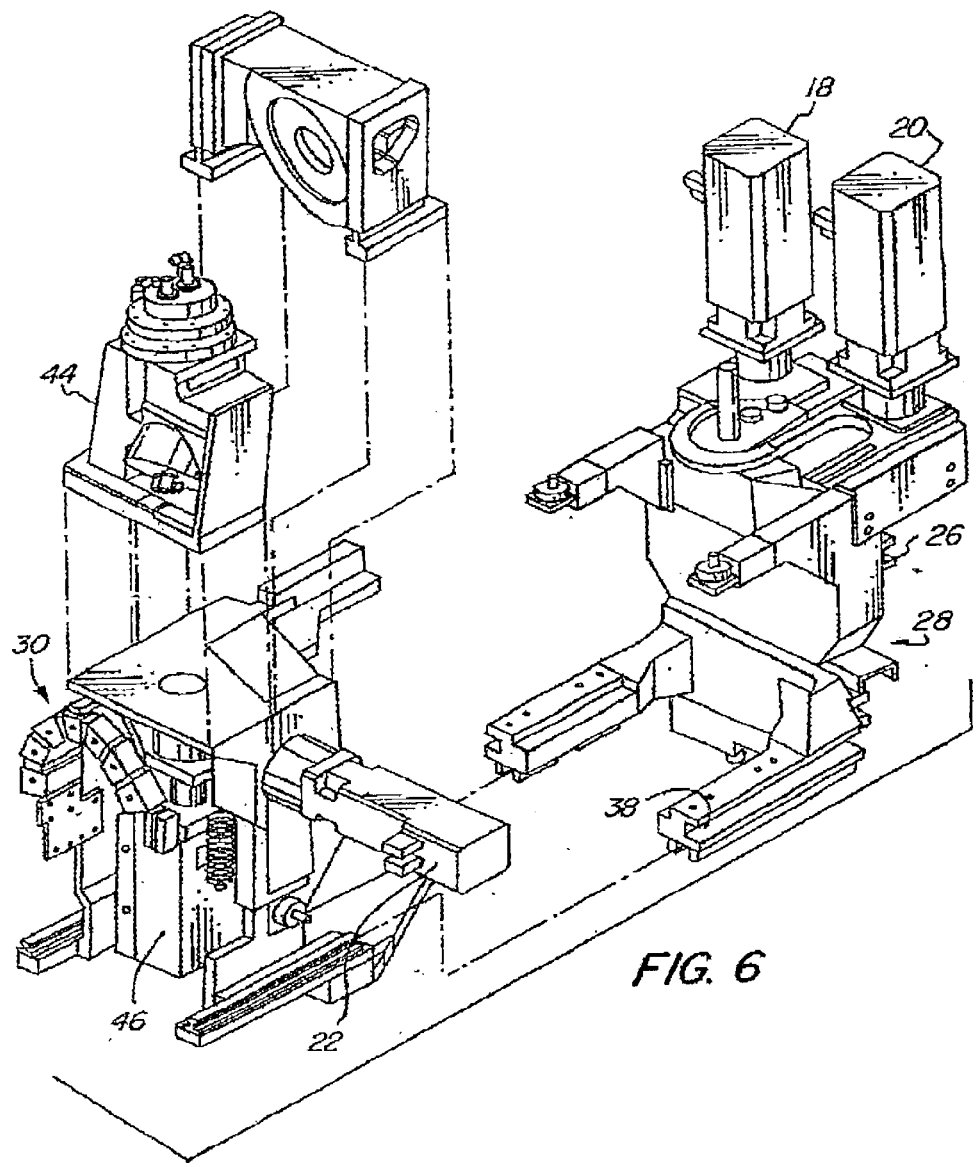
FIG. 6 is a partially exploded view thereof showing the major subassemblies.
Figure 7:
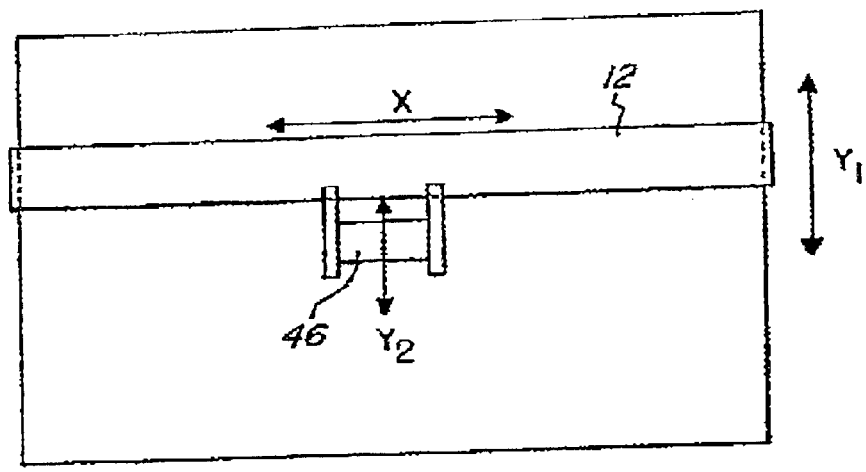
FIG. 7 is a diagrammatic view showing the several axes of motion.

As seen in FIG. 1, a machining tool assembly embodying the present invention is generally designated by the numeral 10 and is mounted on the bridge 12 which is supported on side rails 14 (only one is shown) for movement over a workpiece support table or bed (not shown). The bridge 12 is moveable on the side rails 14 in the Y-axis direction by the motor 16. The machining tool assembly 10 is movable along the bridge 12 in the X-axis direction by motor 18. Two additional motors 20 and 22 effect movement of the machining tool (not shown) in the Y-axis and vertically in the Z-axis, as will be discussed more fully hereinafter.

Turning next to FIGS. 2–6, the bridge 12 has a pair of guides 24 on which are seated the channel numbers 26 of the transverse axis housing 28 for movement of the housing 28 along the bridge 12 by operation of the motor 18. Mounted on the transverse axis housing 28 is the small axis housing generally designated by the number 30 which has racks 32 mounted thereon. The gear shaft 34 is driven by the motor 20 and has two pinions 36 engaged with the racks 32 to effect motion of the small axis housing 30 in the Y-axis direction. Motion of the housing 30 is guided by the linear slide assemblies 38.

A laser beam is transported to the cutting head along the bridge 12 by a beam delivery system including a bellows (not shown) in which it is shielded. The beam is directed by the bridge mirror 42 into a beam redirector generally designated by the 44 and which has a pair of mirrors (not shown) that initially direct the beam upwardly and then downwardly to a focussing lens (not shown) in the laser cutting head generally designated by the numeral 46. The bellows 47 shields the laser beam between the bridge mirror 42 on the transverse axis housing 28 and the laser cutting head 44 supported on the small axis housing 30. The laser cutting head 46 is movable vertically by the motor 22 to focus the laser beam on the workpiece.

In operation of the machine tool, the computer control 60 is programmed to operate the drive motors to produce the desired motion of the laser cutting head 46 relative to the workpiece. As in conventional, the motor 16 moves the bridge 12 in the Y-axis direction, and the motor 18 moves the machining tool assembly in the X-axis direction. The motor 22 moves the cutting head 46 vertically (Z-axis) to focus the laser beam.

The computer control 60 can also activate the drive motor 20 to move the small axis housing 30 in the Y-axis relative to the transverse axis housing 28. Thus, when only small Y-axis motion for the cutting action is required, that motion may be effected by the relative movement of only the small axis housing 30, and that motion is faster due to the large inertia of the entire bridge 12. Because there is less mass to be moved, movement of the small axis housing 30 also tends to provide better quality cutting action for intricate contours. If a large displacement along the Y-axis is required to reposition the laser cutting head 46 relative to the workpiece, or if the length of the cut exceeds the range of motion of the small axis housing 30, the computer control 60 will activate the motor 16 to move the bridge 12. On occasion, both Y-axis drives may be operated simultaneously.

Figure 8:
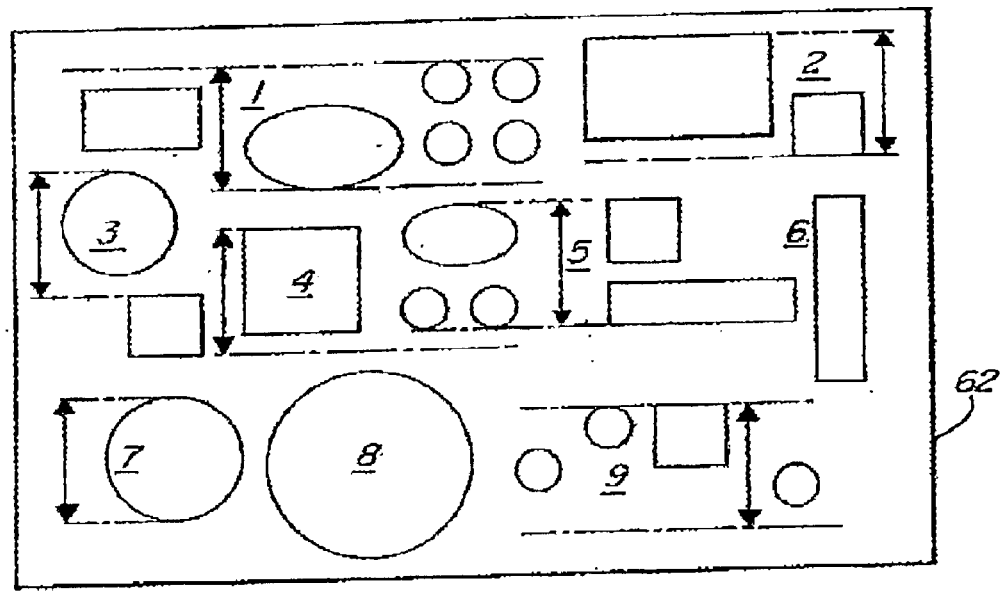
FIG. 8 is an illustration of various parts laid out on a workpiece ad showing which can be cut by use of the small Y-axis motion.

Turning now to FIG. 8, therein illustrated is a workpiece 62 on which are laid out 23 cutout parts configurations which are identified by numerals 1–9 either individually or in groups as shown by dotted line. The arrows indicate the range of travel of the small axis housing, relative to the transverse axis housing 28. As can be seen, the cutouts of 1–5, 7 and 9 can be effected by using the Y-axis motion of only the small axis housing 30. The cutouts 6 and 8 exceed the length of travel of the small axis housing 30 and require use of the bridge drive motor 16 either for the entire motion in the Y-axis or to reposition the bridge 12 for further cutting by movement of the small axis housing 30.

Figure 9:
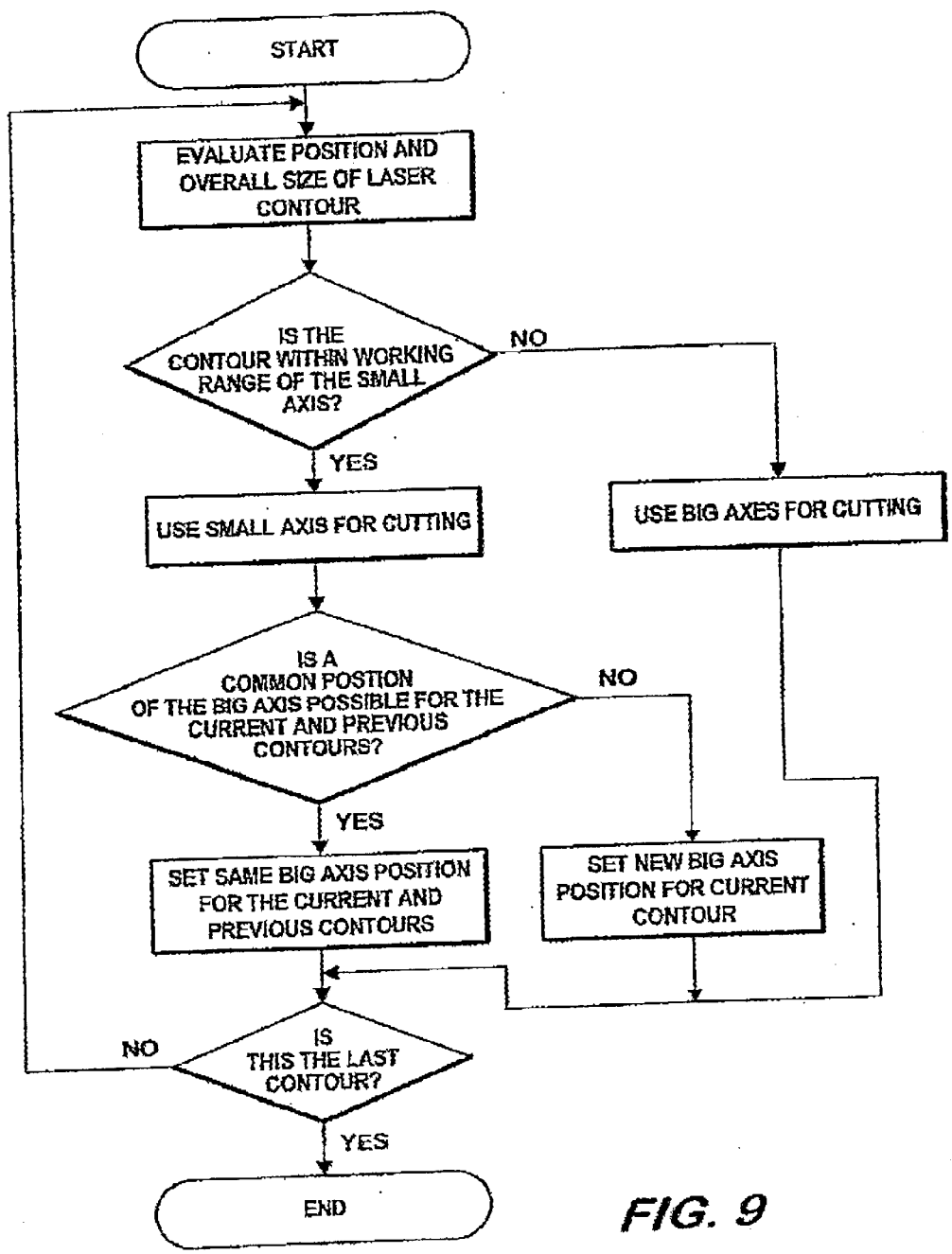
FIG. 9 is a flow chart of computer software which determines the Y-axis motions to be employed in machining parts from a workpiece.

As seen in FIG. 9, a computer program to optimize the cutting action selects the appropriate Y-axis device action for the contours of the cuts to be made so as to maximize use of the motion provided by the small axis housing 30. Generally, the layout of the parts on the workpiece is done off-line using CAD software, and the layout program is then transferred to the machine tool computer.

As previously indicated, the entire machining tool assembly can be enclosed in a protective housing if so desired. The power supply cables for the several motors are generally supported on the bridge so that the machining tool assembly can move back and forth along the length of the bridge. The same is true with respect to tubing for supplying cutting or shielding gas to the laser cutting head.

It will be readily appreciated that the addition of the second drive in the Y-axis affords significant advantages in time for operation, quality of cutting action and wear on the larger machine parts. The bridge is typically a substantial structure requiring a relatively powerful motor to effect its motion along the length of the worktable. In contrast, a small housing containing the laser cutting head can be relatively light and can be moved very quickly with relatively little inertia to be overcome. As a result, the laser cutting action afforded by movement of the small housing is more precise, particularly when there is change in direction. The computer control software can easily manage the cutting procedure and synchronize the motion in both X and Y-axes and the superposition of the two motions possible in the Z-axis in order to best process the workpiece.

In a commercial embodiment of the present invention, the range of motion of the small axis housing is 100 mm, but longer ranges may be readily provided.

The software will normally evaluate all cuts within the numeric control program including absolute position, relative position to each other and overall size of each part. The overall size will determine which cuts will fit within the working range of the small axis motion; the relative position of the contours to each other will define how many consecutive parts can be cut with the small axis motion without moving the entire bridge, and the absolute position defines the base position for the bridge at the start of any given action.

With this information in hand, the machine control positions both axes during the movement to the next cut. The bridge will be placed so that the maximum possible numbers of cuts can be reached by the small axis motion without moving the bridge. When the program determines that the contour of a part falls outside this envelope, the bridge moves to a new base position for the next series of cuts utilizing only the motion of the small axis housing. Thus, the software will optimize the process by minimizing the movements of the bridge and the cutting required by motion of the bridge and by concurrently maximizing the cutting which is accomplished by the motion of the small axis housing. If a contour is of a length which exceeds the working range of the motion for the small axis housing, there are several possibilities:

1. The contour of the part can be cut completely by using the motion of the bridge.
2. The large contour can be split into several smaller segments which can be cut by use of the small axis motion with the bridge being periodically moved. Obviously another potential solution is to reorient the parts on the workpiece so that the length in the axis is within the range of motion of the small axis housing as indicated previously.

Thus it can be seen from the foregoing detailed specification and attached drawings that the machine tool of the present invention is one which provides relatively rapid machining action by minimizing the motion required of the large bridge on which the machining tool is supported. Moreover, since the machining tool can be moved very quickly in the one axis and relatively small mass is required to be moved, the cutting action can be more precise in the cutting of complex contours. The reduction in motion of the bridge also provides a longer-lived installation and reduces the cost of operation.

Having thus described the invention, what is claimed is:

1. A machine tool for matching workpieces by motion of a machining tool relative to the workpiece comprising:

(a) a worktable having X and Y axes and adapted to support a workpiece thereon;

(b) a support extending transversely above said worktable in the X-axis and movable along the Y-axis of said worktable;

(c) first machining tool mounting means movably mounted on said support for movement along said support in said X-axis;

(d) second machining tool mounting means movably mounted on said first machining tool mounting means for movement in said Y-axis relative to said support within a range of motion;

(e) a machining tool mounted said second matching tool mounting means;

(f) first drive means for said support to move said support in said Y-axis over said worktable;

(g) second drive means for said first matching tool mounting means to move said first machining tool mounting means in said X-axis along said support;

(h) third drive means for moving said second machining tool mounting means in said Y-axis relative to said first machining tool mounting means; and (i) a computer control for effecting operation of said first and second drive means to move said machining tool in X and Y axes and for effecting operation of said third drive means for rapid movement of said machining tool in the Y-axis to machine a workpiece supported on said worktable.

2. The machine tool in accordance with claim 1 wherein said support is a bridge member spaced above and extending transversely of said worktable.

3. The machine tool in accordance with claim 1 wherein said machining tool is supported on said second machining tool mounting means for vertical movement in a Z-axis and said machine tool includes fourth drive means for moving said machining tool in said Z-axis, said computer control also effecting operation of said fourth drive means.

4. The machine tool in accordance with claim 1 wherein said computer control includes means for determining whether a desired length of movement in the Y-axis is within said range of motion of said second machining tool mounting means on said first machining tool mounting means in said Y-axis to effect the desired movement by said third drive means.

5. The machine tool in accordance with claim 1 wherein said computer control includes means for determining whether a desired length of movement in the Y-axis is beyond said range of motion of said second machining tool mounting means and for effecting the desired movement of the machining tool in the Y-axis by operation of said first drive means to move said support and by operation of said third drive means to move said second machining tool mounting means.

6. The machine tool in accordance with claim 1 wherein said computer control includes means for effecting a large displacement of said support in the Y-axis to reposition said machining tool relative to the workpiece and, thereafter for effecting a smaller displacement of said second machining tool mounting means said Y-axis to effect machining on the workpiece in the Y-axis.

7. The machine tool in accordance with claim 1 wherein said machining tool is a laser cutting head.

8. The machine tool in accordance with claim 1 wherein said machining tool is mounted in a housing providing said second machining tool mounting means and slidable on guides supported on a transverse axis housing providing said at machining tool mounting means movable on said support in the Y-axis.

9. A laser cutting machine tool for laser cutting of workpieces by motion of a laser cutting head relative to the workpiece comprising:

(a) a worktable having X and Y axes and adapted to support a workpiece thereon;

(b) a bridge member extending transversely above said worktable in the X-axis and movable along the Y-axis of said worktable;

(c) first tool mounting means movably mounted on said bridge member for movement along said support in said X-axis;

(d) second tool mounting means movably mounted on said first machining tool mounting means for movement in said Y-axis relative to said support within a range of motion;

(e) a laser cutting head mounted said second tool mounting means;

(f) first drive means for said bridge to move said bridge member in said Y-axis over said worktable;

(g) second drive means for said first tool mounting means to move said first machining tool mounting means in said X-axis along said bridge member;

(h) third drive means for moving said second tool mounting means in said Y-axis relative to said first machining tool mounting means; and (i) a computer control for effecting operation of said first and second drive means to move said laser cutting head tool in X and Y axes and for effecting operation of said third drive means for rapid movement of said cutting head in the Y-axis. Said computer control including means for determining whether a desired length of movement In the Y-axis is within said range of motion of said second machining tool mounting means on said first machining tool mounting means In said Y-axis to effect the desired movement by said third drive means and also including means for determining whether a desired length of movement in the Y-axis is beyond said range of motion of said second tool mounting means and for effecting the desired movement of the laser cutting head in the Y-axis by operation of said first drive means to move said bridge and by operation of said third drive means to move said second mounting means.

10. The laser cutting machine tool in accordance with claim 9, wherein said computer control includes means for effecting a large displacement of said bridge member in the Y-axis to reposition said machining tool relative to the workpiece and, thereafter for effecting a smaller displacement of said second machining tool mounting means said Y-axis to effect machining on the workpiece in the Y-axis.

11. The laser cutting machine tool in accordance with claim 9, wherein said laser cutting head is supported on said second machining tool mounting means for vertical movement in a Z-axis and said machine tool includes fourth drive means for moving said machining tool in said Z-axis, said computer control also effecting operation of said fourth drive means.

12. The laser cutting machine tool in accordance with claim 9, wherein said machining tool is mounted in a housing providing said second machining tool mounting means and slidable on guides supported on a transverse axis housing providing said first tool mounting means movable on said support in the Y-axis.

* * * * *